United States Patent
Berroth

(10) Patent No.: US 7,015,668 B2
(45) Date of Patent: Mar. 21, 2006

(54) METHOD FOR COMMUTATING AN ELECTRONICALLY COMMUTATED MOTOR AND MOTOR FOR CARRYING OUT SAID METHOD

(75) Inventor: Hansjörg Berroth, Vs-Obereschach (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 32 days.

(21) Appl. No.: 10/503,641

(22) PCT Filed: Jan. 28, 2003

(86) PCT No.: PCT/EP03/00834

§ 371 (c)(1),
(2), (4) Date: Aug. 4, 2004

(87) PCT Pub. No.: WO03/067747

PCT Pub. Date: Aug. 14, 2003

(65) Prior Publication Data

US 2005/0083002 A1     Apr. 21, 2005

(30) Foreign Application Priority Data

Feb. 6, 2002  (DE) ................ 102 04 889

(51) Int. Cl.
*H01R 39/46* (2006.01)
(52) U.S. Cl. .................. 318/439; 318/254; 318/138
(58) Field of Classification Search ........... 318/439, 318/254, 138, 701; 307/248

See application file for complete search history.

(56) References Cited

U.S. PATENT DOCUMENTS

| | | | |
|---|---|---|---|
| 4,376,261 A | 3/1983 | von der Heide et al. | ... 318/254 |
| 4,482,849 A | 11/1984 | Doemen et al. | ............ 318/254 |
| 4,710,684 A | 12/1987 | Okita et al. | ................ 318/254 |
| 5,099,138 A | 3/1992 | Fukunaga | .................... 307/248 |
| RE34,399 E | 10/1993 | Gami et al. | ............. 350/73.01 |
| 5,349,275 A | 9/1994 | Müller | ....................... 318/254 |
| 5,408,150 A | 4/1995 | Wilcox | ....................... 327/108 |
| 2004/0135537 A1* | 7/2004 | Conner et al. | .............. 318/701 |
| 2004/0139767 A1* | 7/2004 | Weinmann et al. | ......... 68/12.16 |

* cited by examiner

*Primary Examiner*—Karen Masih
(74) *Attorney, Agent, or Firm*—Milton Oliver, Esq.; Ware Fressola Van Der Sluys & Aldolphson LLP

(57) ABSTRACT

An improved method of commutating an electronically commutated motor (20) is disclosed. The motor has a positive (34) and a negative connecting lead (36), a stator having at least one winding phase (22), a permanent-magnet rotor (26), a rotor-position sensor (28) for producing a rotor position signal (u1, u2), and a full bridge circuit (78), comprising a pair of Metal Oxide Semiconductor Field Effect Transistors (MOSFETs) coupled to each end of each winding phase (22). In order to prevent current shoot-through and prolong the service life of the MOSFETs, without employing a microprocessor, a respective-comparator (90, 90', 92, 92') is coupled to the gate of each MOSFET, in order to assure that the MOSFET is switched ON and OFF at an optimum time.

23 Claims, 3 Drawing Sheets

METHOD FOR COMMUTATING AN ELECTRONICALLY COMMUTATED MOTOR AND MOTOR FOR CARRYING OUT SAID METHOD

This application is a § 371 of PCT/EP03/00834, filed 28 Jan. 2003.

FIELD OF THE INVENTION

The invention concerns a method for commutating an electronically commutated motor, and a motor for carrying out such a method.

BACKGROUND

Electronically commutated motors operate with a stator winding that has a small number of phases. The motors principally used have one, two, or three phases. These phases can have power supplied to them in different ways depending on the type of electronics; supplying power via a full bridge circuit offers particular advantages.

With a full bridge circuit, steps must be taken to ensure that a short circuit does not occur in the full bridge. There are numerous circuits for this, for example the circuit according to U.S. Pat. No. 4,376,261, von der Heide, et al., which is based on the principle of creating a small gap between two control pulses. When the full bridge is controlled via a microprocessor ($\mu$P), corresponding current off-times can thus be "built into" the program, ensuring that upon commutation the one transistor switches off, then there is a delay of, for example, 50 $\mu$s, and only then is the other transistor switched on. A prerequisite for this, however, is that a microprocessor be used, and this is too expensive for many applications. The current off-time of, for example, 50 $\mu$s must furthermore be made so long that is sufficiently long under all operating conditions, with the result that, especially at higher rotation speeds, power output may be "wasted" because the current off-time could be shorter under many operating conditions.

SUMMARY OF THE INVENTION

It is therefore an object of the invention to make available a novel method for commutating an electronically commutated motor, and a motor having a full bridge circuit for carrying out such a method.

According to the invention, this object is achieved by feeding a rotor position signal to a comparator which controls when a bridge transistor turns OFF, monitoring the gate potential of the transistor being turned off, to determine when to turn ON the next transistor, and using another comparator to turn ON that next transistor.

A comparator is thus associated with each MOSFET of the bridge. When one of these MOSFETs is to be switched off, this occurs directly by way of its comparator. When one of these MOSFETs is to be switched on, the associated comparator then monitors the gate potential of the MOSFET that is to be switched off, i.e., in practice, its source-gate voltage. A reliable signal is thereby obtained as to when that MOSFET is blocked, and only then is the MOSFET that is to be switched on, switched on. It is very advantageous that with this method, the comparators are utilized differently depending on their instantaneous function (switching off or switching on), i.e. in one case as an amplifier, in the other as a comparator. The power output of such a motor can moreover be increased in many cases by optimizing the current off-time.

The stated object is achieved in a different fashion by controlling current flow through the winding phase using a p-channel MOSFET between the positive lead and the winding, and an n-channel MOSFET between the winding and the negative lead, with each MOSFET being controlled by a respective comparator, one of the comparators responding to the rotor position signal, and the other of the comparators responding to a gate voltage of the transistor being switched off. A motor of this kind combines reliable commutation with a very simple and inexpensive configuration, good power output, quiet operation, and a long service life for the MOSFETs in the full bridge circuit.

Further details and advantageous refinements of the invention are evident from the exemplary embodiment, in no way to be understood as a limitation of the invention, that is described below and depicted in the drawings.

BRIEF FIGURE DESCRIPTION

DETAILED DESCRIPTION

Figure 1:
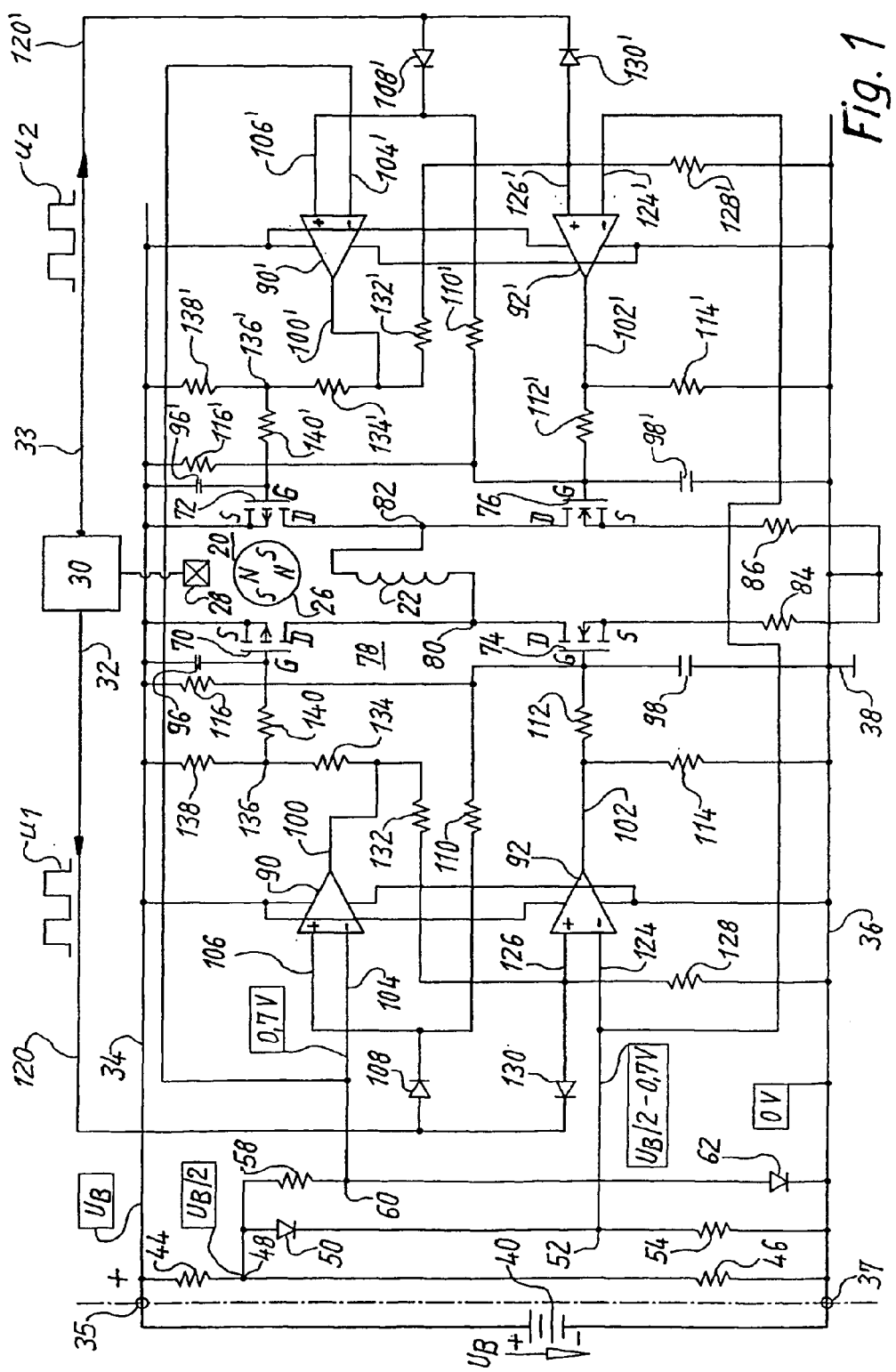
FIG. 1 is a circuit diagram of a preferred embodiment of an electronically commutated motor for carrying out a method according to the present invention.
Figure 2:
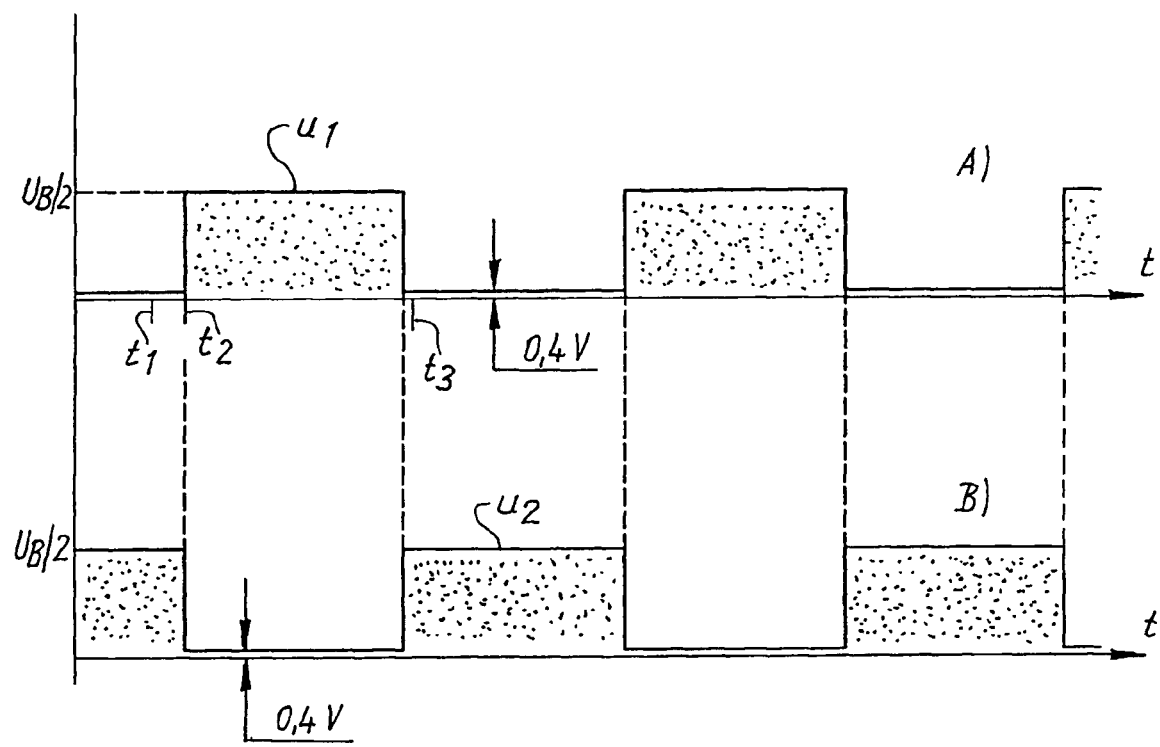
FIG. 2 is a diagram showing pulse sequences u1 and u2, to explain FIG. 1.

FIG. 1 shows, for explanation of the invention, a single-phase two-pulse electronically commutated motor 20 having a single stator winding phase 22, also having a permanent-magnet rotor 26 that is depicted as a four-pole rotor, and having a Hall generator 28 whose output signal is fed to an arrangement 30 having an output 32 and an output 33 antivalent thereto. In arrangement 30, the output signal of Hall generator 28 is converted into two square-wave signals u1 and u2, which are depicted in FIG. 2 and proceed in oppositely-phased fashion. These can, if necessary, be shifted in phase in known fashion as a function of the rotation speed of motor 20; this is not depicted.

Motor 20 is supplied with voltage via a positive connecting lead 34 and a negative connecting lead 36 that is usually connected to ground 38. Leads 34, 36 can be connected via respective connecting terminals 35 and 37 to a battery 40 whose voltage is labeled $U_B$ and is usually, in this case, in the range between 5 and 32 V. The leads can also be powered from a rectifier, and are also referred to as a "DC link" circuit.

Located between leads 34 and 36 is a voltage divider having, for example, two identical resistors 44, 46, 50 that a potential of approximately $U_B/2$, i.e. slightly less than half the operating voltage, is present at their connecting point 48. The amplitude of pulses u1 and u2 is a function of $U_B$ and is preferably also equal to $U_B/2$.

Node 48 is connected to the anode of a diode 50 whose cathode is connected via a node 52 and a resistor 54 to negative lead 36. A potential of approximately $$(U_B/2 - 0.7\text{ V}) \tag{1},$$

is thus obtained at node 52, i.e. lower than the potential $U_B/2$ by an amount equal to the threshold voltage of diode 50

(approx. 0.7 V); this means that when operating voltage $U_B$ changes (for example, because battery 40 is deeply discharged), the potential $U_B/2$ at node 48 changes and the potential ($U_B/2-0.7$ V) at node 52 likewise changes, so that these potentials change but a difference between nodes 48 and 52 of approx. 0.7 V is maintained.

Node 48 is also connected via a resistor 58 and a node 60 to the anode of a diode 62 whose cathode is connected to negative lead 36. The result is a potential at node 60 that is approximately 0.7 V higher than the potential (0 V) of lead 36.

Four MOSFET transistors serve to control the current in phase 22 of motor 20, namely a p-channel MOSFET 70 at upper left, a p-channel MOSFET 72 at upper right, an n-channel MOSFET 74 at lower left, and an n-channel MOSFET 76 at lower right. The four transistors 70 through 76 together constitute a full bridge circuit 78 in the form of an H-bridge. This is constituted by two half bridges, namely the left MOSFETs 70 and 74 on the one hand, and the right MOSFETs 72 and 76 on the other hand. Source S of transistors 70 and 72 is connected to positive lead 34. Drain terminals D of transistors 70 and 74 are connected to a node 80 and to a terminal of winding phase 22. Drain terminals D of transistors 72 and 76 are connected to a node 82 and to the other terminal of winding phase 22. Source S of transistor 74 is connected via a resistor 84 to negative lead 36, and source S of transistor 76 thereto via a resistor 86. Resistors 84 and 86 can serve for current measurement, e.g. for a current limiter (not depicted).

If this is not desired, these resistors can be omitted.

When transistors 70 and 76 are conductive, a current flows from positive lead 34 through transistor 70 and terminal 80 to phase 22, and on through transistor 76 and resistor 86 to negative lead 36. When transistors 72 and 74 are conductive, on the other hand, a current then flows from positive lead 34 through transistor 72, terminal 82, winding phase 22, transistor 74, and resistor 84 to negative lead 36.

During the switchover between these two states, it must not happen that transistors 70 and 74 are simultaneously conductive for a short period of time, or that transistors 72 and 76 are briefly both conductive, since the resulting short-circuit (or "shoot-through") current would destroy these transistors or at least shorten their service life. The present invention is intended to prevent or at least greatly reduce this.

A comparator 90 serves to control upper left transistor 70, and a comparator 92 to control lower left transistor 74. In FIG. 1, the right half of the circuit is symmetrical to the left half, and the components there are therefore labeled identically but with an appended apostrophe ('). Upper right transistor 72 is thus controlled by a comparator 90', and lower right transistor 76 by a comparator 92'. (The additional components on the right side are not described. For them, the reader is referred to the description of the left side of FIG. 1.)

Gate G of transistor 70 is connected via a capacitor 96, and gate G of transistor 72 via a capacitor 96', to positive lead 34. Gate G of transistor 74 is connected via a capacitor 98, and gate G of transistor 76 via a capacitor 98', to negative lead 36. These capacitors prevent abrupt changes in the voltage between source (S) and gate (G) of transistors 70 through 76 and, depending on their size, cause switching operations to become slower with the result that motor 20 runs more quietly.

Switching P-Channel Transistors 70 and 72 on and Off

When one of transistors 70 or 72 is to be switched on, its gate potential must be modified in the direction toward negative lead 36; in other words, its source-gate voltage USG must be increased to a value in the preferred range 1.5–4 V, maximum 20 V. In this case output 100 of upper comparator 90, or output 100' or upper comparator 90', is therefore connected internally to negative lead 36, thus causing voltage USG to increase correspondingly because the potential at output 100 substantially determines the potential at the gate of transistor 70.

Conversely, when one of transistors 70 or 72 is to be switched off, its gate potential must be modified in the direction toward positive lead 34, so that USG becomes less than 1.4 V.

This is done by making output 100 or 100' high-resistance.

The potential at gate G of the relevant transistor 70 or 72 thus changes in the positive direction during the transition from the switched-on to the switched-off state, and when USG falls below a predetermined value, this means that the relevant transistor 70 or 72 is safely blocked, i.e. is in a high-resistance state.

Switching N-Channel Transistors 74 and 76 on and Off

When one of transistors 74 or 76 is to be switched on, its gate potential must be modified in the direction toward positive lead 34, i.e. its gate-source voltage UGS must increase to a preferred value in the range 1.5 to 4 V, maximum 20 V. In this case, output 102 of lower comparator 92, or output 102' of lower comparator 92', is therefore made high-resistance, with the result that voltage UGS of the relevant transistor 74 or 76 rises, and the latter becomes conductive.

Conversely, when one of transistors 74 or 76 is to be switched off, output 102 or 102' is then connected to negative lead 36 so that UGS drops below 1.4 V and the relevant transistor 74 or 76 is blocked.

The potential at gate G of the relevant transistor 74 or 76 thus changes in the negative direction during the transition from the switched-on to the switched-off state; and when UGS falls below a predetermined value, this means that the relevant transistor 74 or 76 is blocked, i.e. is in its high-resistance state.

Negative input 104 of upper comparator 90, like negative input 104' of comparator 90', is connected to node 60, i.e. is at a potential of approximately 0.7 V with reference to negative lead 36. Positive input 106 of comparator 90 is connected to the cathode of a diode 108, and also via a resistor 110 to gate G of lower left transistor 74. This gate G is in turn connected via a resistor 112 to output 102 of lower left comparator 92, and via a resistor 116 to positive lead 34. Output 102 is also connected via a resistor 114 to negative lead 36. The anode of diode 108 is connected to an input 120 to which is conveyed, during operation, a square-wave signal u1 (FIG. 2A) that is opposite in phase to a square-wave signal u2 (FIG. 2B) that is conveyed to input 120'.

As FIG. 2 shows, in this example signals u1 and u2 have an amplitude of $U_B/2$ corresponding to the logical value "1", or of <0.4 V corresponding to the logical value "0". Amplitude $U_B/2$ is thus a linear function of operating voltage $U_B$ (see FIG. 3).

Negative input 124 of lower comparator 92, like negative input 124' of lower comparator 92', is connected to node 52, at which a potential of approximately ($U_B/2-0.7$ V) is present, i.e. for example, for a voltage $U_B=20$ V, a potential of approximately $$(20/2-0.7)=9.3 \text{ V} \qquad (2).$$

Positive input 126 of comparator 92 is connected via a resistor 128 to negative lead 36, likewise to the anode of a diode 130 whose cathode is connected to terminal 120. Input 126 is furthermore connected via a resistor 132 to output 100. The latter is connected via a resistor 134, a node 136, and a resistor 138 to positive lead 34. Node 136 is connected via a resistor 140 to gate G of upper transistor 70.

Preferred values of the components in FIG. 1 for a motor with $U_B=24$ V (k=kilohm; R=resistor; C=capacitor):

| | |
|---|---|
| Diodes 50, 62, 108, 108', 130, 130' | bas16 |
| Comparators 90, 90', 92, 92' | LM2901 |
| p-channel MOSFETs 70, 72 | IRFR9024 |
| n-channel MOSFETs 74, 76 | IRFR024 |
| C 96, 96', 98, 98' | 4 nF |
| R 44, 46 | 20 k |
| R 54, 58, 110, 110', 128, 128', 132, 132' | 470 k |
| R 134, 134' | 1.1 k |
| R 114, 114', 136, 136' | 3 k |
| R 116, 116' | 510 ohm |
| R 112, 112', 140, 140' | 300 ohm |
| R 84, 86 | 0–0.1 ohm |

Mode of Operation

The description of the mode of operation makes reference only to the left half of FIG. 1, i.e. to the left half bridge. The right half is configured identically and therefore functions in the same way, but because signals u1 and u2 are opposite in phase, processes on the right side occur with a 180-degree phase shift from processes on the left side, as one skilled in the art of electrical engineering will readily understand. For example, when upper left transistor 70 is switched on, lower right transistor 76 is switched on approximately simultaneously; and when upper right transistor 72 is switched on, lower left transistor 74 is switched on approximately simultaneously.

At time t1 in FIG. 2A, signal u1 at input 120 has a value of approx. 0.4 V, diode 130 becomes conductive, and the potential at positive input 126 therefore corresponds to the sum of that 0.4 V plus the voltage at diode 130 (approx. 0.7 V), i.e. approximately 1.1 V in total. This is lower than the potential at negative input 124, which according to equations (1) and (2) is equal to ($U_B/2-0.7$ V). Output 102 in lower comparator 92 is therefore connected internally to ground 36, so that the UGS of transistor 74 is low and the latter is blocked.

The low potential at gate G of lower left transistor 74 is transferred through resistor 110 to positive input 106 of upper comparator 90. This potential is lower than the potential (0.7 V) at negative input 104, so that output 100 of upper comparator 90 is connected internally to ground 36. By way of voltage divider 134 (1.1 k) and 138 (3 k), gate G of upper left transistor 70 acquires a potential of approx. 25% of operating voltage $U_B$, so that at time t1 transistor 70 is conductive while lower left transistor 74 blocks.

At time t2 in FIG. 2A, signal u1 changes from 0.4 V to $U_B/2$. This causes the previously conductive diode 130 to block, i.e. lower comparator 92 now serves to control the switching-on operation of lower left transistor 74 as a function of the gate potential of upper transistor 70. Diode 108 now becomes conductive, and as a result a potential of approximately ($U_B/2-0.7$ V) is present at positive input 106 of upper left comparator 90. (The 0.7 V corresponds to the voltage at diode 108, and $U_B/2$ corresponds to the amplitude of signal u1.) Since this potential ($U_B/2-0.7$ V) is higher than the reference potential of 0.7 V at negative input 104 of upper comparator 90, the latter's output 100 becomes high-resistance, so that by way of the voltage divider made up of the four resistors 138, 134, 132, and 128, the potential at gate G of upper transistor 70 is pulled toward positive, and upper left transistor 70 consequently blocks.

The increase in the potential at gate G of upper transistor 70 is somewhat delayed by capacitor 96, i.e. this capacitor determines the rate of increase. The parasitic capacitances in transistor 70 also contribute to this. The increase in the potential at output 100 is transferred via (identically sized) resistors 132 and 128 to positive input 126 of lower comparator 92. Only when this potential has reached approximately twice the value ($U_B/2-0.7$ V), i.e. when upper transistor 70 is safely blocked, is lower comparator 92 switched over to high resistance so that the voltage at gate G of lower left transistor 74 rises sufficiently that that transistor becomes conductive. Resistor 110 causes the potential at positive input 106 of upper comparator 90 to be raised so that the latter's output 100 remains at high resistance, and transistor 70 remains securely blocked.

It is thus evident that the change in potential at the gate of transistor 70 is transferred to positive input 126 of lower comparator 92. The increase must be somewhat greater than twice ($U_B/2-0.7$ V) because of voltage divider 128, 132, and lower transistor 74 is switched on when that is the case.

In this case, upper transistor 70 is therefore switched off directly by means of signal u1 via upper diode 108, while lower diode 130 blocks and disconnects lower comparator 92 from signal u1, so that the latter component can delay the switching-on of transistor 74 until upper transistor 70 is safely blocked.

At time t3 (FIG. 2), signal u1 changes from $U_B/2$ to 0.4 V. As a result, diode 108 blocks, diode 130 becomes conductive, and positive input 126 of lower comparator 92 receives a potential of approximately 0.4 V+0.7 V=1.1 V. (The 0.7 V corresponds to the voltage at diode 130.) Output 102 of lower comparator 92 is thereby connected internally to lead 36, causing transistor 74 to block (after capacitor 98 discharges).

It should be noted here that the voltage values 0.4 V and 0.7 V are approximate values for a quantitative example, and that different values may occur in reality.

The change in the potential at output 102 is transferred through resistors 112, 110 to positive input 106 of upper comparator 90. When the potential at input 106 becomes lower than the potential (0.7 V) at negative input 104, output 100 of the upper comparator is then pulled down to the potential of negative lead 36, so that the voltage USG between source and gate of upper transistor 70 rises correspondingly and the latter is switched on.

Upper transistor 70 is thus not switched on until the gate-source voltage UGS of lower transistor 74 has dropped to a value below the reference voltage of 0.7 V at positive input 104, i.e. when lower transistor 74 is in the safe, high-resistance region. Resistors 128, 132 cause positive input 126 to receive a lower potential, so that the output of comparator 92 remains low-resistance and keeps transistor 74 blocked. At time t3, therefore, the previously conductive lower transistor 74 becomes blocked, and only when it is safely blocked is upper transistor 70 switched on.

It is evident that one of the two diodes 108, 130 serves respectively to block one of the two transistors 70, 74 immediately when signal u1 changes, while the other diode blocks and thereby allows the comparator associated with it to operate as a comparator. This comparator compares the (variable) potential at its positive input with a reference voltage that, in this example, is equal to 0.7 V for upper comparator 90 and has a value of ($U_B/2-0.7$ V) for lower comparator 92; in other words, for lower comparator 92, this reference voltage is a function of voltage $U_B$ and changes with it. This enables safe operation even when voltage $U_B$ changes greatly during operation, e.g. as a result of charging or discharging of backup battery 40 that is depicted.

Figure 3:
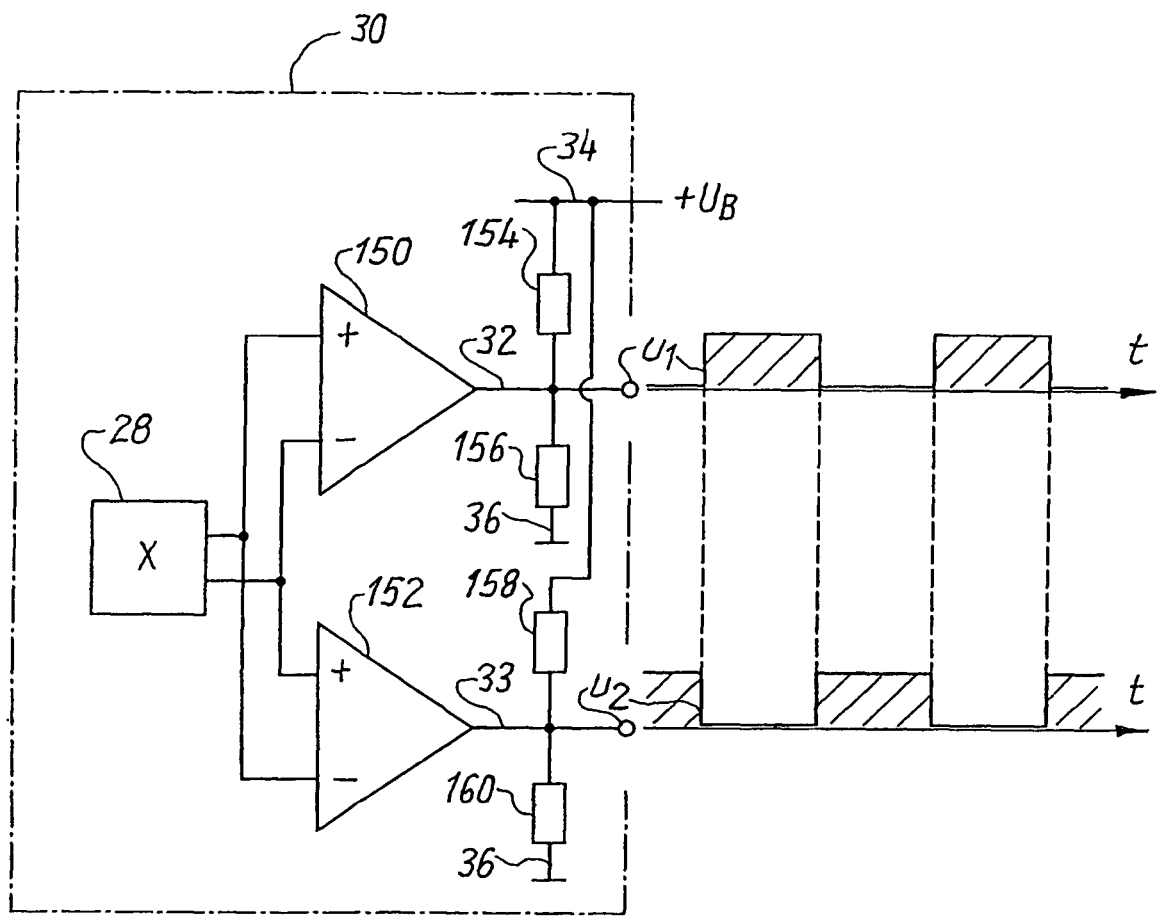
FIG. 3 is a circuit diagram to explain, by way of example, the generation of two opposite-phase rotor position signals u1, u2, the amplitudes of which depend on the operating voltage $U_B$ of the motor.

FIG. 3 shows an exemplifying embodiment for circuit 30 (FIG. 1) in a simplified configuration in which the instant of commutation is not dependent on rotation speed.

FIG. 3 uses two comparators 150, 152 to whose inputs the output signal of Hall generator 28 is conveyed, as depicted, with reversed polarity. The two comparators 150, 152, like comparators 90, 92, are open-collector comparators, i.e. when the potential at the positive input of comparator 150 is higher than at the negative input, its output 32 is high-resistance; and when the potential at the positive input is lower than at the negative input, output 32 is connected internally to negative lead 36, so that a potential of approx. +0.4V (with reference to negative lead 36) is obtained at output 32.

Output 32 is connected via a resistor 154 to positive lead 34, and via a resistor 156 to negative lead 36. Resistors 154, 156 are identical in size, i.e. when output 32 is high-resistance, it acquires the potential UB/2 through resistors 154, 156.

The same applies analogously to comparator 152, whose output 33 is connected via a resistor 158 to positive lead 34 and via a resistor 160 to negative lead 36. Resistors 158, 160 are also identical in size, so that once again a potential $U_B/2$ exists at output 33 when that output is high-resistance, and a potential of 0.4 V when that output is connected internally to negative lead 36.

The amplitude of signals u1, u2 is thus directly proportional to voltage $U_B$, which can vary within wide limits during operation.

Since the reference potential at node 52 of FIG. 1 is also dependent on voltage $U_B$, i.e. has the value ($U_B/2-0.7$ V) in accordance with equation (1), the four comparators 90, 90', 92, 92' can reliably control full bridge circuit 78 even when voltage $U_B$ changes. This is because the voltages that must be compared with one another using comparators 92, 92' change in the same direction. Instead of $U_B/2$ (i.e. a factor of 0.5), a different factor such as $0.6*U_B$ or $0.4*U_B$ could of course also be selected, in which case resistors 44, 46, 128, 132, 154, 156, 158, and 160 would then need to be adapted accordingly. The approach using a factor of 0.5 is preferred, however, because in this case identical resistors with low tolerances can be used.

Many variants and modifications are, of course, possible within the scope of the present invention.

What is claimed is:

1. A method of commutating an electronically commutated motor (20), which motor comprises
   a positive connecting lead (34) and a negative connecting lead (36);
   a stator having at least one winding phase (22);
   a permanent-magnet rotor (26);
   a rotor position sensor (28) for producing at least one rotor position signal (u1, u2) dependent on the position of that rotor (26);
   a full bridge circuit (78), associated with the at least one winding phase (22) and controllable by means of the rotor position sensor (28), said full bridge circuit having upper transistors (70, 72), implemented as MOSFETs, that control the connection of the at least one winding phase (22) to the positive connecting lead (34), and lower transistors (74, 76), implemented as MOSFETs complementary to the upper transistors (70, 72), that control the connection of the at least one winding phase (22) to the negative connecting lead (36),
   two complementary MOSFET transistors (e.g. 70, 74) being connected in series in each bridge arm, and a comparator (90, 90', 92, 92') being associated with each MOSFET transistor of the full bridge circuit (78) in order to control that transistor,
   comprising the steps of:
   in the context of a predetermined change in the rotor position signal (u1, u2), switching OFF the MOSFET transistor of a bridge arm to be switched off, in a manner controlled by that signal change, by means of the comparator associated with that transistor;
   while the MOSFET transistor to be switched off is being switched off, monitoring the gate potential of the MOSFET transistor to be switched off by means of a comparator associated with the MOSFET transistor of a bridge arm that is to be switched on; and
   once that gate potential has reached a value that is characteristic of a switching off of the MOSFET transistor to be switched off, switching ON the MOSFET transistor to be switched on by means of the comparator associated with it.

2. An electronically commutated motor (20) that comprises
   a positive connecting lead (34) adapted to carry an operating voltage ($U_B$) and a negative connecting lead (36);
   a stator having at least one winding phase (22);
   a permanent-magnet rotor (26);
   a rotor position sensor (28) for producing at least one rotor position signal (u1, u2) dependent on the position of that rotor (26);
   a full bridge circuit (78), associated with the at least one winding phase (22) and controllable by means of the rotor position sensor (28), said full bridge circuit having upper transistors (70, 72), implemented as p-channel MOSFETs, that control the connection of the at least one winding phase (22) to the positive connecting lead (34), and lower transistors (74, 76), implemented as n-channel MOSFETs, that control the connection of the at least one winding phase (22) to the negative connecting lead (36),
   one p-channel MOSFET and one n-channel MOSFET being connected in series in each bridge arm,
   and each MOSFET of the full bridge circuit (78) having associated with it, in order to control said MOSFET, a respective comparator (90, 90', 92, 92'), of which one comparator, upon a commutation, in a manner controlled by the rotor position signal (u1, u2), makes the transistor, presently to be switched off, of the relevant bridge arm, nonconductive,
   and the other comparator compares a signal dependent on the source-gate voltage, of the bridge transistor to be switched off, with a reference voltage, in order to switch on the bridge transistor controlled by that other comparator only when the magnitude of that source-gate voltage falls below a predetermined value.

3. The motor according to claim 2,
   wherein the rotor position signal (u1, u2) is fed to the two comparators (90, 92) of a bridge arm via a respective diode (108, 130), the diode (108) of the one comparator (90) being polarized oppositely to the diode (130) of the other comparator (92).

4. The motor according to claim 3,
wherein the diodes (108, 130) are polarized in such a way that the respective diode, of the comparator that is associated with the bridge transistor to be switched on, blocks, in order to enable, by means of that comparator, a comparison of the gate potential, of the bridge transistor to be switched off, with a predetermined reference voltage.

5. The motor according to claim 2,
wherein at least one of the reference voltages, associated with said bridge transistors, is a function of the operating voltage ($U_B$) of the motor (20).

6. The motor according to claim 2,
wherein the amplitude ($U_B/2$) of the rotor position signal (u1, u2) is a function of the operating voltage ($U_B$) of the motor (20).

7. The motor according to claim 2,
wherein a capacitance (96, 96', 98, 98') is provided to delay a signal change at the gate of at least one transistor (70, 72, 74, 76) of the full bridge (78).

8. The motor according to claim 7,
wherein an internal parasitic capacitance, of a transistor of the full bridge, serves as the capacitance for delaying the signal change at the gate of that transistor.

9. The motor according to claim 2,
wherein the comparators (90, 92) of a bridge arm are connected to one another (110, 132) to form a bistable element, in order to achieve a stable switching state after a commutation, as long as the rotor position signal (u1, u2) changes less than a predetermined amount.

10. The motor according to claim 3,
wherein the comparators (90, 92) of a bridge arm are connected to one another (110, 132) to form a bistable element, in order to achieve a stable switching state after a commutation, as long as the rotor position signal (u1, u2) changes less than a predetermined amount.

11. The motor according to claim 4,
wherein the comparators (90, 92) of a bridge arm are connected to one another (110, 132) to form a bistable element, in order to achieve a stable switching state after a commutation, as long as the rotor position signal (u1, u2) changes less than a predetermined amount.

12. The motor according to claim 5,
wherein the comparators (90, 92) of a bridge arm are connected to one another (110, 132) to form a bistable element, in order to achieve a stable switching state after a commutation, as long as the rotor position signal (u1, u2) changes less than a predetermined amount.

13. The motor according to claim 6,
wherein the comparators (90, 92) of a bridge arm are connected to one another (110, 132) to form a bistable element, in order to achieve a stable switching state after a commutation, as long as the rotor position signal (u1, u2) changes less than a predetermined amount.

14. The motor according to claim 7,
wherein the comparators (90, 92) of a bridge arm are connected to one another (110, 132) to form a bistable element, in order to achieve a stable switching state after a commutation, as long as the rotor position signal (u1, u2) changes less than a predetermined amount.

15. The motor according to claim 3,
wherein at least one of the reference voltages, associated with said bridge transistors, is a function of the operating voltage ($U_B$) of the motor (20).

16. The motor according to claim 4,
wherein at least one of the reference voltages, associated with said bridge transistors, is a function of the operating voltage ($U_B$) of the motor (20).

17. The motor according to claim 3,
wherein the amplitude ($U_B/2$) of the rotor position signal (u1, u2) is a function of the operating voltage ($U_B$) of the motor (20).

18. The motor according to claim 4,
wherein the amplitude ($U_B/2$) of the rotor position signal (u1, u2) is a function of the operating voltage ($U_B$) of the motor (20).

19. The motor according to claim 5,
wherein the amplitude ($U_B/2$) of the rotor position signal (u1, u2) is a function of the operating voltage ($U_B$) of the motor (20).

20. The motor according to claim 3,
wherein a capacitance (96, 96', 98, 98') is provided to delay a signal change at the gate of at least one transistor (70, 72, 74, 76) of the full bridge (78).

21. The motor according to claim 4,
wherein a capacitance (96, 96', 98, 98') is provided to delay a signal change at the gate of at least one transistor (70, 72, 74, 76) of the full bridge (78).

22. The motor according to claim 5,
wherein a capacitance (96, 96', 98, 98') is provided to delay a signal change at the gate of at least one transistor (70, 72, 74, 76) of the full bridge (78).

23. The motor according to claim 6,
wherein a capacitance (96, 96', 98, 98') is provided to delay a signal change at the gate of at least one transistor (70, 72, 74, 76) of the full bridge (78).

* * * * *

UNITED STATES PATENT AND TRADEMARK OFFICE
CERTIFICATE OF CORRECTION

| | | |
|---|---|---|
| PATENT NO. | : 7,015,668 B2 | Page 1 of 1 |
| APPLICATION NO. | : 10/503641 | |
| DATED | : March 21, 2006 | |
| INVENTOR(S) | : Berroth et al. | |

It is certified that error appears in the above-identified patent and that said Letters Patent is hereby corrected as shown below:

On The Title Page, Item (57)
In the abstract, line 11, after "respective" delete "-"
In column 2, line 56, delete "50" and substitute --so--
In column 3, line 36, delete "'2" and substitute --72--

Signed and Sealed this

Fifteenth Day of May, 2007

JON W. DUDAS
*Director of the United States Patent and Trademark Office*